United States Patent [19]

Miller

[11] Patent Number: 5,041,275

[45] Date of Patent: Aug. 20, 1991

[54] REDUCED ACID BUILDUP IN MOIST SULFUR DURING STORAGE

[75] Inventor: Alex E. Miller, Placentia, Calif.

[73] Assignee: Union Oil Company of California, Los Angeles, Calif.

[21] Appl. No.: 512,650

[22] Filed: Apr. 20, 1990

[51] Int. Cl.$^5$ .............................................. C01B 17/10
[52] U.S. Cl. .................................. 423/269; 23/293 S; 106/18.32
[58] Field of Search .............. 23/293 S, 308 S, 313 R; 423/265, 269, 274, 275, 567 R, 576.2, 578 R, 578 A; 299/6; 106/18.32, 18.34, 287.32; 264/7, 11, 13, 14

[56] References Cited

U.S. PATENT DOCUMENTS

| | | | |
|---|---|---|---|
| 3,504,061 | 3/1970 | Elliot | 23/308 S |
| 3,637,351 | 1/1972 | Young et al. | 423/567 R |
| 3,661,530 | 5/1972 | Block | 423/268 |
| 3,689,227 | 9/1972 | Block | 264/14 |
| 3,830,631 | 8/1974 | Young et al. | 423/567 R |
| 4,133,668 | 1/1979 | Young | 264/7 |
| 4,219,347 | 8/1980 | Young | 252/189 |
| 4,302,237 | 11/1981 | Young | 252/189 |
| 4,326,875 | 4/1982 | Young | 252/189 |
| 4,393,037 | 7/1983 | Delaney et al. | 423/576.2 |
| 4,863,645 | 9/1989 | Harbolt et al. | 264/13 |

OTHER PUBLICATIONS

*Inorganic Sulphur Chemistry*, Nickless, ed. Elsevier Publishing Co. 1968, pp. 271-272.
"Oxidation of Sulfur in Soils," George R. Burns, Technical Bulletin No. 13, The Sulfur Institute, Jan. 1967.

*Primary Examiner*—Jeffrey E. Russel
*Attorney, Agent, or Firm*—William M. Dooley; Gregory F. Wirzbicki

[57] ABSTRACT

Moist particulate sulfur is subject to microbial oxidation during extended storage, resulting in an undesirable accumulation of sulfuric acid in the sulfur. Treatment of the sulfur with an antimicrobial agent reduces or prevents the formation of the acid.

48 Claims, No Drawings

REDUCED ACID BUILDUP IN MOIST SULFUR DURING STORAGE

INTRODUCTION

Elemental sulfur is a bulk commodity used in agriculture and industry. It is manufactured and shipped in large quantities, often in shiploads. Sulfur must sometimes be stored for months awaiting shipment.

Certain commercial processes for the production of particulate, elemental sulfur involve the quenching of molten sulfur droplets in water. The resulting product usually contains a few percent water. Removal of the water would be costly and is generally unnecessary. Because of the quantities involved, the sulfur is often stored in large, deep piles. Consequently, the sulfur stays moist during storage. Particulate sulfur is also sometimes stored outdoors in open containers and can be wetted by rainfall even if it is dry when first made.

SUMMARY OF THE INVENTION

Sulfuric acid builds up in moist, particulate sulfur during extended storage. Quality specifications for elemental sulfur usually set a maximum on the acidity of the sulfur, measured as sulfuric acid. Sulfur having high acidity may be rejected by potential purchasers or may be purchased only at a substantially lower price. High acidity also causes problems with corrosion of transportation and storage equipment, the holds of ships, and concrete walls and floors.

It has now been found that the formation of at least a substantial proportion of the acid is a result of microbiological activity, rather than atmospheric oxidation as might have been expected. The biological agent involved is believed to comprise one or more forms of thiobacilli, which are bacteria capable of feeding on sulfur in the presence of air and moisture and oxidizing the sulfur to form sulfuric acid.

The present invention involves the treatment of particulate sulfur with a preservative that prevents or retards the buildup of acidity in the sulfur when the sulfur is stored in a moist condition for an extended period. More specifically, the present invention involves the treatment of particulate sulfur with an antimicrobial agent, i.e., a biocide or biostat, that prevents or retards the buildup of acidity by the action of a microorganism when the sulfur is stored in a moist condition for an extended period. Preferably, the antimicrobial is applied topically to the sulfur particles.

DETAILED DESCRIPTION OF THE INVENTION

Any particulate sulfur can be treated beneficially in accordance with this invention. The microorganisms responsible for acid formation generally live and feed on the surfaces of the sulfur particles. Particulate sulfur having a relatively higher surface area per gram will be affected by the microorganisms to a greater degree than particulate sulfur having a relatively lower surface area per gram, and thus will benefit relatively more from treatment in accordance with this invention. For a given weight of particulate sulfur, the surface area is inversely related to the particle size and directly related to the pore volume of the particles and to the roughness and irregularity of the particle shapes. Particulate sulfur having a surface area of at least about 0.001, more preferably at least about 0.01, and even more preferably at least about 0.1, square meters per gram is preferred for use in accordance with this invention.

The present invention relates to the protection of moist sulfur during storage. The problem of acid buildup only occurs in moist sulfur, because the acid-producing microorganisms require moisture for growth. The term "moist" as used herein with reference to particulate sulfur in storage means having a sufficient moisture content to support undesirable growth of acid-forming microorganisms under the actual or anticipated conditions and duration of storage. Sulfur with a low moisture content, e.g., less than about 0.5 weight percent, will not usually support sufficient growth of undesirable microorganisms to cause objectionable acid buildup during normal storage periods, i.e., up to about 3 months. Thus, particulate sulfurs having a moisture content of at least about 1 weight percent, preferably at least about 2 weight percent, and more preferably at least about 3 weight percent, are preferred for use in the practice of this invention. The benefits of the invention are maintained at still higher levels of moisture, e.g., 4 weight percent, 5 weight percent, and higher, and even when the sulfur is fully submersed in water. Dry sulfur, such as flowers of sulfur, can also be treated, and it will be protected from the formation of acid if it is then stored in a moist condition. However, the most preferred particulate sulfur is made by quenching molten sulfur in water because, unless it is carefully dried, such sulfur usually carries with it enough water to sustain objectionable growth of microorganisms and hence will benefit the most from treatment in accordance with this invention.

Sulfur treated in accordance with this invention is usually stored at ambient temperature. Except in extremes of cold or heat, conditions within piles of moist particulate sulfur stored at ambient temperature support the growth of acid-forming microorganisms. Thus, moist particulate sulfur stored at any temperature or range of temperatures that supports the growth of the acid-forming microorganisms can be treated beneficially in accordance with this invention. Very low (e.g., less than about 32. F) and very high (e.g., above about 120. F) average storage temperatures will kill or retard the growth of the microorganisms and thus prevent or limit the formation of acid. Therefore, the practice of this invention is most beneficial when moist particulate sulfur is stored at average temperatures at least about 40. F, preferably at least about 50 F, and more preferably at least about 60. F. The average storage temperature is usually less than about 110 F, preferably less than about 100 F, more preferably less than about 90 F. The extremes of temperature occurring during storage may of course be lower and higher than the averages. The temperature within the bulk of the stored sulfur, where most of the microorganisms live, will be determined by the average ambient temperature rather than by brief extremes.

Antimicrobial agents useful in the practice of this invention include all agents which are stable in contact with elemental sulfur and which kill, or retard the growth or reproduction of, sulfur-oxidizing microorganisms. As used in the specification and the claims, "stable" means that the antimicrobial agent retains antimicrobial activity for at least about 1 month in contact with moist elemental sulfur. More preferably, the antimicrobial agent is stable for at least about 3 months, and still more preferably for at least about 6 months. Preferably, the antimicrobial agent is low in cost, nonvolatile, does not degrade the sulfur to any appreciable extent under the conditions of application and storage, and does not render the sulfur less fit for its intended use.

Among the useful antimicrobial agents are surfactants, preferably cationic surfactants, more preferably quaternary ammonium compounds and cyclical alkylammonium compounds such as pyridinium, quinolinium, isoquinolinium, phthalazinium, benzimidazolium, benxothiazolium, benzotriazolium, pyrrolidinium, imidazolinium, piperidinium, morpholinium, thiamorpholinium, piperazinium, 1,3-benzoxazinium, 1,3,5-trialkylhexahydro-1,3,5-triazinium, and N-hexahydroazepinium compounds; fatty amines and amine acetates; aldehydes such as formaldehyde, glutaraldehyde, acetaldehyde, and glyoxal; bases such as ammonia and sodium hydroxide. Additional examples of useful, commercially available antimicrobial agents include 1-(-3-chloroallyl)-3,5,7-triaza-1-azoniaadamantane chloride; benzyl bromoacetate; dimethoxane; 6-acetoxy-2,4-dimethylm-dioxane; o-phenylphenol; o-benzyl p-chlorophenol; sodium o-phenylphenate; cocoamine salt of tetrachlorophenol; pentachlorophenol; sodium pentachlorophenate; bromonitrostyrene; 1,2-dibromo-2,4-dicyanobutane; isothiazolinones such as 1,2-benzisothiazolin-3-one, 5-chloro-2-methyl-1,4-isothiazolin-3-one, 2-n-octyl-4-isothiazolin-3-one, and 2-methyl-4-isothiazolin-3-one; di (phenyl mercury) dodecenyl succinate; sodium dimethyldithiocarbamate; sodium 2-mercaptobenzothiazole; zinc dimethyldithiocarbamate; zinc 2-mercaptobenzothiazole; tetrachloroisophthalonitrile; N-trichloromethylthio-4-cyclohexene-1,2diacarboximide; N-(trichloromethylthio) phthalimide; 3-iodo-2-propynyl butyl carbamate; potassium N-hydroxymethyl-N-methyldithiocarbamate; hexahydro-1,3,5-triethyls-triazine; tetrahydro-3,5-dimethyl-2H-1,3,5-thiadiazine-2-thione; lower alkyl p-hydroxybenzoates such as methyl and butyl p-hydroxybenzoates; zinc 2-pyridinethiol-N-oxide; N-trichloromethyl thiophthalimide; salicylanilide; brominated salicylanilides such as 5,4'-dibromosalicylanilide, 3,4',5-tribromosalicylanilide and 3,5,6'-tribromosalicylanilide; 2-[(hydroxymethyl)amino]-2-methylpropanol; 2-[(hydroxymethyl)amino]ethanol; 3,5-dimethyl-tetrahydro-1,3,5-2H-thiadiazine-2-thione; diiodomethyl p-tolyl sulfone; p-chloromethyl diiodomethyl sulfone; zinc pyridinethione-N-oxide; sodium pyridinethione-N-oxide; 1,1'-(2-butenylene) bis(3,5,7-triaza-1-azoniaadamantane chloride); solubilized copper 8-quinolinolate; 8-quinolinol citrate; 8-quinolinol benzoate; tributyltin fluoride; bis(-tributyltin) oxide; modified barium metaborate; thiocyanomethylthio benzothiazole; hydroxypropyl methanethiolsulfonate; copper borate; zinc borate; p-chloro-m-cresol; phenyl mercury acetate; phenyl mercury oleate; phenyl mercury oleate; phenyl mercury 2-ethylhexylmaleate; alkyl amine/organotin salt complex; dimethylol dimethyl hydantoin; 2,3,5-trichloro-4-propylsulfonyl pyridine; 2,3,5,6-tetrachloro-4-(methyl sulfonyl)-pyridine; methylethylketoxime; dodecylguanidine hydrochloride; dodecylguanidine acetate; methylenebisthiocyanate; chloroethylene bisthiocyanate; 3,4,5-trichloro-2,6-dicyanopyridine; dichlorophene; 2-(4-thiazolyl) benzimidazole; phenarsazine chloride; phenarsazine dimethyl dithiocarbamate; and triphenarsazine chloride. Quaternary ammonium compounds are preferred for their effectiveness, low toxicity to higher organisms, freedom from metals, environmental acceptability, and their compatibility with agricultural and industrial uses to which the treated sulfur may be put; in addition, they bind tightly to the sulfur particles and will not leach away with water that drains from the sulfur.

Quaternary ammonium compounds are widely used as biocides and disinfectants. One class of quaternary ammonium compounds can be represented by the general formula

$R_1R_2R_3R_4N^+X^-$ wherein each of the four R groups independently is an organic radical, preferably a hydrocarbyl organic radical, more preferably an alkyl, aralkyl, or aryl radical, typically having from 1 to about 50 carbon atoms, and preferably from 1 to about 24 carbon atoms; and X is any convenient salt-forming anion such as a chloride ion. The four R groups together have a total of at least 4 carbon atoms, typically at least about 10 carbon atoms, more preferably at least about 15 carbon atoms; and up to about 75 carbon atoms, preferably up to about 60 carbon atoms.

The presence in a quaternary ammonium ion of at least one higher aliphatic, preferably alkyl, group having at least about 12 carbon atoms enhances the biocidal activity of the ion. Thus, antimicrobial compositions comprising higher alkyl substituted quaternary ammonium ions are most preferred. In this embodiment of the invention, at least one, preferably the largest, of the four R groups is an alkyl group having at least about 12 carbon atoms, and more preferably, when all of the R groups are aliphatic, between about 16 and about 18 carbon atoms. The presence of an aralkyl group such as a benzyl group in combination with a higher alkyl group even further enhances the biocidal activity of a quaternary ammonium ion. When at least one of the R groups is an aralkyl group such as benzyl, the largest R group is preferably an alkyl group having between about 12 and about 16 carbon atoms. Examples of useful R groups include, without limitation, methyl, ethyl, n-propyl, isopropyl, n-butyl, isobutyl, t-butyl, octyl, dodecyl, octadecyl, benzyl, and phenyl groups.

Different biocides can have different levels of activity against different microorganisms. Thus, when more than one type of microorganism can be present or when the microorganism present has not been specifically identified, mixtures of two or more quaternary ammonium compounds are preferred.

Many suitable quaternary ammonium compounds are commercially available. Specific examples of useful quaternary ammonium compounds include tetramethyl-, ethyltrimethyl-, methylethylphenylbenzyl-, methylethylpropylbutyl-, trimethyloctadecyl-, dimethyldioctadecyl-, trimethyltallow-, trimethylsoya-, trimethylcoco-, dimethyldicoco-, dimethyldi(hydrogenated tallow)-, trimethyldodecyl-, trimethylhexadecyl-, trimethylbenzyl-, dimethyldodecylbenzyl-, dimethyltetradecylbenzyl-, dimethylhexadecylbenzyl-, dimethyloctadecylbenzyl-, methylbis(2-hydroxyethyl)coco-, methylpolyoxyethylenecoco-, methylbis(2-hydroxyethyl)oleyl-, methylpolyoxyethyleneoleyl-, methylbis(2-hydroxyethyl)octadecyl-, methylpolyoxyethyleneoctadecyl-, n-dodecyltetradecyldimethylbenzyl-, n-tetradecylhexadecyldimethylbenzyl-, n-dodecyltetradecyldimethylbenzyl-, n-dodecyltetradecyldimethyldichlorobenzyl-, n-octadecyldimethylbenzyl-, and n-dodecyltetradecylhexadecyldimethylethylbenzylammonium chlorides; and alkyl dimethyl ethylbenzyl ammonium cyclohexylsulfamate.

Another class of quaternary ammonium compounds useful in the practice of this invention consists of tetravalent nitrogen ring compounds in which the ring nitrogen also bears an organic radical, e.g., lauryl pyridinium chloride and hexadecyl pyridinium chloride.

It is believed that strong bases such as sodium hydroxide function as antimicrobial agents in the practice of this invention simply by raising the pH of the residual moisture on the sulfur particles to a level of alkalinity at which the sulfur-oxidizing microorganisms cannot live or at least cannot grow and multiply. However, such bases are not preferred because they can react slowly with the sulfur to produce soluble sulfur compounds, which may be undesirable in some situations. For example, such soluble sulfur compounds can be leached from a sulfur pile by rainfall and contaminate runoff from the storage site.

The antimicrobial agent can be applied to the sulfur at any stage in the manufacturing process. If it is sufficiently stable and non-reactive, it can be incorporated into molten sulfur that is to be formed into particles. Preferably, it is applied as a surface coating to sulfur particles. The antimicrobial agent can be added to quench water used to quench molten sulfur droplets, so that the sulfur particles formed in the quenchy bath are uniformly coated with the antimicrobial agent as soon as they are formed. It can be applied to sulfur particles as a spray in solution, preferably with mixing to promote more uniform distribution.

Sulfur particles can be dipped in a separate bath containing the antimicrobial agent. If the particles are porous, the dip time can be extended to allow the antimicrobial agent to penetrate the pores. Dip times of a few seconds up to about 10 minutes will usually be sufficient. It may be helpful to include in the bath a wetting agent, such as a polyethoxylated surfactant, or solvent capable of readily wetting sulfur, such as isopropyl alcohol, to enhance penetration of the pores.

The antimicrobial agent is normally used in sufficient proportion to inhibit excessive acid formation for the desired length of time. The precise proportion of a given agent to use depends on factors such as the type of agent, the particular microorganisms present, the particle size range and distribution and moisture content of the sulfur, and the storage conditions. As a general guide, the antimicrobial agent is usually applied in a proportion of at least about 10 parts per million (ppm), preferably at least about 100 ppm, more preferably at least about 500 ppm, based on the moisture content of the sulfur being treated. Higher proportions, e.g., 1000 ppm or 2500 ppm, can also be used. Corresponding proportions based on dry weight of sulfur are 0.5, 5, 25, 50, and 125 ppm, respectively. If dry sulfur is being treated, the proportion of antimicrobial agent is normally calculated based on the anticipated moisture content of the sulfur during storage.

Particulate sulfur intended for use in agriculture is sometimes treated with hydrocarbon compounds to render it free-flowing or to facilitate utilization of the sulfur by plants. In the practice of this invention, it is preferred that no hydrocarbon compounds be present when the sulfur is initially treated with the preservative or during storage.

EXAMPLE 1

Molten sulfur was quenched in agitated water to produce irregularly sized and shaped particles up to about 1 cm maximum cross-sectional dimension and having a surface area of about 0.1 square meter per gram. After recovery from the quench bath, the particulate sulfur had a residual moisture content of about 5 weight percent. A 1000-ton batch of the moist sulfur was treated with a 15 weight percent aqueous solution of Variquat 80 ME, a dimethyl alkyl ($C_{12}$-$C_{16}$) benzyl ammonium chloride supplied by Sherex Chemical Company, Inc., at the rate of 50 ppm based on the dry weight of the sulfur or 1000 ppm based on the moisture content of the sulfur, assumed to average about 5 weight percent. A second 1000-ton batch of sulfur was treated with a mixture of the Variquat solution and anhydrous ammonia at the rate of 1000 ppm Variquat and 6000 ppm ammonia, based on the moisture content of the sulfur. A third 1000-ton batch of sulfur was treated with aqueous sodium hydroxide at the rate of 1000 ppm based on moisture content. In each case, the chemical treatment was trickled onto the sulfur particles as they entered a 10 foot long delivery auger; mixing within the auger provided limited distribution of the treatment chemical onto the sulfur particles. Two more 1000-ton batches were mechanically dewatered to moisture contents of 3 and 4 weight percent. These batches were all piled on areas of a warehouse floor normally used to store production sulfur. Finally, two additional 1000-ton batches of untreated sulfur were piled on areas of the warehouse floor sprayed with 1 percent and 5 percent solutions, respectively, of the Variquat.

After three months, samples were taken from each pile at several depths, ground up in measured amounts of water, and titrated for acid content with aqueous sodium hydroxide to a phenolphthalein endpoint. Table 1 presents the results.

TABLE 1

| | Acidity Within Sulfur Piles After Three Months' Storage | | | | | | |
|---|---|---|---|---|---|---|---|
| | | | | Variquat treatment | | | |
| | Mechanically Dewatered | | NaOH Spray | Floor Spray | | Product Spray - 0.1% | |
| | 3% wt. % | 4% wt. % | 0.1% wt. % | 1% wt. % | 5% wt. % | w/Ammonia wt. % (ppm) | w/o Ammonia wt. % (ppm) |
| | | | Sulfuric Acid Content | | | | |
| Floor | 0.60 | 1.89 | 0.50 | 0.97 | 0.64 | 0.54 | 0.28 |
| 3 inches | 0.29 | 0.52 | 0.24 | 0.53 | 0.22 | 0.11 | 0.03 |
| 6 inches | 0.16 | 0.23 | 0.16 | 0.34 | 0.16 | 0.03 | <0.01 (24) |
| 9 inches | 0.14 | 0.25 | 0.08 | 0.37 | 0.17 | 0.01 (121) | <0.01 (21) |
| 1 foot | 0.12 | 0.14 | 0.06 | 0.28 | 0.14 | 0.10 | <0.01 (17) |
| 1 foot 3 inches | 0.09 | 0.16 | 0.03 | 0.23 | 0.11 | 0.09 | <0.01 (21) |
| 1 foot 6 inches | 0.08 | 0.08 | 0.03 | 0.19 | 0.11 | 0.01 (96) | <0.01 (14) |
| 1 foot 9 inches | 0.08 | 0.10 | 0.01 | 0.21 | 0.09 | 0.01 (89) | <0.01 (18) |
| 2 feet | 0.09 | 0.08 | 0.02 | 0.14 | 0.12 | 0.01 (76) | <0.01 (14) |

TABLE 1-continued

| | Acidity Within Sulfur Piles After Three Months' Storage | | | | | | |
|---|---|---|---|---|---|---|---|
| | Mechanically Dewatered | | NaOH Spray | Floor Spray | | Variquat treatment Product Spray - 0.1% | |
| | 3% wt. % | 4% wt. % | 0.1% wt. % | 1% wt. % | 5% wt. % | w/Ammonia wt. % (ppm) | w/o Ammonia wt. % (ppm) |
| 3 feet | 0.09 | 0.04 | <0.01 | 0.16 | 0.09 | 0.01 (69) | <0.01 (18) |
| 4 feet | 0.08 | 0.06 | 0.10 | 0.11 | 0.11 | 0.01 (63) | <0.01 (21) |
| 5 feet | 0.06 | 0.05 | <0.01 | 0.18 | 0.05 | 0.01 (56) | <0.01 (28) |
| 6 feet | 0.03 | 0.16 | 0.02 | 0.15 | 0.05 | 0.01 (63) | <0.01 (17) |
| 7 feet | 0.03 | 0.15 | 0.01 | 0.16 | 0.02 | 0.01 (69) | <0.01 (14) |
| 8 feet | 0.04 | 0.11 | 0.03 | 0.19 | 0.05 | <0.01 (50) | <0.01 (14) |
| 9 feet | 0.03 | 0.17 | 0.04 | 0.16 | 0.02 | <0.01 (36) | 0.01 (56) |
| 10 feet | 0.05 | 0.14 | 0.04 | 0.08 | 0.04 | <0.01 (30) | <0.01 (45) |
| 11 feet | 0.06 | 0.02 | 0.02 | 0.07 | 0.02 | 0.01 (56) | <0.01 (35) |
| 12 feet | 0.07 | | 0.01 | | 0.06 | | 0.01 (59) |
| | | | Moisture Content | | | | |
| Floor | 6.6 | 10.3 | 10.3 | 6.1 | 4.7 | 3.6 | 8.5 |
| 3 inches | 3.6 | 4.9 | 4.6 | 3.3 | 3.0 | 3.1 | 4.1 |
| 6 inches | 2.2 | 3.1 | 2.6 | 3.9 | 2.2 | 2.8 | 2.9 |
| 9 inches | 2.2 | 3.1 | 1.7 | 3.5 | 1.8 | 2.5 | 2.7 |
| 1 foot | 1.7 | 2.4 | 1.7 | 3.1 | 1.5 | 2.8 | 2.7 |
| 1 foot 3 inches | 1.7 | 2.8 | 1.5 | 2.9 | 1.4 | 3.3 | 2.5 |
| 1 foot 6 inches | 2.0 | 2.4 | 1.7 | 2.6 | 1.3 | 2.8 | 2.3 |
| 1 foot 9 inches | 1.9 | 3.0 | 1.7 | 2.2 | 1.5 | 3.3 | 2.2 |
| 2 feet | 2.0 | 2.7 | 1.5 | 1.5 | 1.9 | 3.5 | 2.1 |
| 3 feet | 1.7 | 3.3 | 2.8 | 1.1 | 1.5 | 3.4 | 2.4 |
| 4 feet | 1.2 | 2.7 | 2.8 | 1.8 | 2.0 | 4.3 | 3.0 |
| 5 feet | 1.3 | 2.2 | 3.1 | 2.0 | 2.0 | 4.0 | 3.1 |
| 6 feet | 2.1 | 2.5 | 3.4 | 2.6 | 2.0 | 3.4 | 3.4 |
| 7 feet | 1.2 | 2.1 | 2.5 | 2.3 | 2.0 | 3.4 | 2.7 |
| 8 feet | 2.0 | 2.5 | 2.8 | 3.1 | 2.0 | 2.9 | 2.9 |
| 9 feet | 1.7 | 2.3 | 1.9 | 1.9 | 1.2 | 3.2 | 3.6 |
| 10 feet | 1.7 | 3.2 | 3.9 | 2.6 | 1.8 | 3.7 | 4.0 |
| 11 feet | 2.8 | <0.1 | 3.8 | 1.6 | 1.3 | 3.9 | 3.0 |
| 12 feet | 0.5 | | 2.9 | | 0.2 | | 4.5 |

The results clearly show that the sulfur treated with the quaternary ammonium compound developed much less acidity during the three-month storage period than dewatered sulfur and untreated sulfur stored on treated floorspace. The sodium hydroxide treatment also provided an appreciable reduction in acid buildup.

Under a current commercial standard, the acid content of bulk sulfur is preferably less than about 0.02 weight percent (200 ppm) calculated as $H_2SO_4$. Treatment with a quaternary ammonium compound held the acidity well below that level throughout the bulk of the treated sulfur piles, except for the bottom 3 to 6 inches, for the entire storage period. Acidity is higher in the bottom 3 to 6 inches of the storage piles because the moisture level there tends to be higher due to drainage within the piles, and because the sulfur there is in contact with the floor, a potential breeding ground for sulfur-oxidizing microorganisms. It is likely that even better results would be obtained if the antimicrobial agent were applied in a way that achieved more uniform distribution on the surfaces of the sulfur particles.

EXAMPLE 2

Molten sulfur was quenched in agitated water to produce irregularly sized and shaped particles up to about 1 cm maximum cross-sectional dimension and having a surface area of about 0.1 square meter per gram. After recovery from the quench bath, the particulate sulfur had a residual moisture content of about 5 weight percent. An aqueous solution of Variquat 80 ME was trickled onto the sulfur particles as they entered a 10 foot long delivery auger; mixing within the auger provided limited distribution of the treatment chemical onto the sulfur particles. The Variquat was applied at the rate of 50 ppm based on the dry weight of the sulfur or 1000 ppm based on the moisture content of the sulfur, assumed to be about 5 weight percent. Samples of treated and untreated sulfur in five gallon buckets were stored for 9 months. Small samples were taken at intervals from the top and middle layers in the buckets and tested for acid content. The results are presented in Table 2.

TABLE 2

| Acidity Of Sulfur Samples Stored for Nine Months $H_2SO_4$, Weight Percent | | | | |
|---|---|---|---|---|
| Time | Untreated | | Treated | |
| Days | Top | Middle | Top | Middle |
| 0 | <0.01 | <0.01 | <0.01 | <0.01 |
| 82 | 0.10 | 0.05 | <0.01 | <0.01 |
| 97 | 0.06 | 0.07 | <0.01 | <0.01 |
| 117 | 0.09 | 0.13 | <0.01 | <0.01 |
| 139 | 0.09 | 0.18 | <0.01 | <0.01 |
| 175 | 0.09 | 0.11 | 0.01 | 0.01 |
| 195 | 0.09 | 0.11 | 0.02 | 0.02 |
| 236 | 0.09 | 0.12 | 0.02 | 0.03 |
| 272 | 0.10 | 0.12 | 0.04 | 0.04 |

Table 2 shows that the treated sulfur remains within commercial specification for at least 175 days, i.e., at least about 6 months. Even longer periods of protection can be achieved by using higher levels of the biocide or by distributing the biocide more uniformly or both.

EXAMPLE 3

A number of antimicrobial agents were screened in an accelerated laboratory test. Treatments are listed in Table 3. In each instance, a 25 weight percent sulfur slurry was prepared by grinding water quenched, freshly washed particulate sulfur in a Waring blender with the selected aqueous treatment solution, which contained sufficient antimicrobial agent to provide the concentration indicated in Table 3 based on the water content of the slurry. The resulting slurry was placed in a vessel equipped for continuous aeration. Aeration was continued for the indicated number of weeks, and water was added to make up for evaporation during the test period; 20 ml aliquots were withdrawn at intervals, filtered, and titrated for acidity. Acidity is reported in Table 4 in terms of milliliters of 0.0286N NaOH required to reach the phenolphthalein endpoint.

TABLE 3

| Treatment |
|---|
| 1 Untreated Control |
| 2 Avanel S150 1000 ppm; anionic sulfate surfactant, PPG |
| 3 Triton X100 1000 ppm; nonionic surfactant, Rohm & Haas |
| 4 Emgard 2063 1000 ppm; nonionic surfactant, Emery |
| 5 Glutaraldehyde 1000 ppm |
| 6 Glutaraldehyde 1000 ppm |
| 7 Glutaraldehyde 100 ppm |
| 8 Glutaraldehyde 100 ppm |

TABLE 3-continued

| Treatment |
|---|
| 9 Glyoxal 1000 ppm |
| 10 Glyoxal 1000 ppm |
| 11 Untreated Control |
| 12 Emgard 2063 1000 ppm |
| 13 Glyoxal 100 ppm |
| 14 Glyoxal 1000 ppm |
| 15 Proxel CRL 1000 ppm; 1,2-benzisothiazolin-3-one, ICI |
| 16 Proxel CRL 1000 ppm; (30% in aqueous ethylenediamine) |
| 17 Proxel CRL 100 ppm |
| 18 Proxel CRL 100 ppm |
| 19 Kathon LX 1000 ppm; Rohm & Haas, mixture of 5-chloro-2-methyl-4-isothiazolin-3-one and 2-methyl-4-isothiazolin-3-one |
| 20 Kathon LX 1000 ppm |
| 21 Untreated Control |
| 22 Glutaraldehyde 1000 ppm |
| 23 Glutaraldehyde 1000 ppm |
| 24 Glyoxal 1000 ppm |
| 25 Glyoxal 1000 ppm |

TABLE 4

| | Treatment | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| | | | | | | | Agent | | | | | |
| | Control | Avanel S150 | Triton X100 | Emgard 2063 | Glutar-aldehyde | Glutar-aldehyde | Glutar-aldehyde | Glutar-aldehyde | Glyoxal | Glyoxal | Control | Emgard 2063 |
| | | | | | | | Level (ppm) | | | | | |
| Week | 1000 | 1000 | 1000 | 1000 | 1000 | 100 | 100 | 1000 | 1000 | | 1000 | |
| 0 | 0.70 | — | — | — | — | — | — | — | — | — | 0.70 | — |
| 1 | 0.55 | 0.70 | 0.80 | 0.80 | 0.90 | 0.90 | 0.70 | 0.85 | 1.00 | 0.80 | 0.85 | 0.70 |
| 2 | 0.60 | 0.65 | 0.80 | 0.80 | 0.90 | 0.85 | 0.65 | — | — | — | 5.00 | 0.75 |
| 3 | 0.60 | 0.50 | 0.65 | 0.60 | — | — | — | — | | | | |
| 4 | 9.00 | 0.50 | 5.30 | 0.70 | — | — | — | — | | | | |
| 5 | 22.00 | 6.20 | 15.80 | 0.70 | — | — | — | — | — | — | 20.00 | — |
| 6 | 30.00 | 12.90 | 23.90 | 13.00 | 0.90 | 0.80 | 0.50 | 0.80 | 0.80 | 0.60 | 21.30 | 0.50 |
| 7 | 33.30 | 14.80 | 26.70 | 22.10 | 0.70 | 0.60 | 0.50 | 0.80 | 0.70 | 0.50 | 22.20 | 2.10 |
| 8 | | | | | — | — | — | — | — | — | | 6.60 |
| 9 | | | | | 0.75 | 0.60 | 0.60 | 0.75 | 0.70 | 0.50 | | 12.10 |
| 10 | | | | | 0.80 | 0.60 | 0.65 | 0.75 | 0.70 | 0.60 | | 24.00 |
| 11 | | | | | 0.60 | 0.55 | 0.65 | 0.70 | 0.70 | 0.50 | | 35.80 |
| 12 | | | | | 0.50 | 0.50 | 3.40 | 0.70 | 0.60 | 0.50 | | 44.20 |
| 13 | | | | | 0.58 | 0.45 | 13.30 | 0.70 | 0.65 | 0.55 | | |
| 14 | | | | | 0.40 | 0.40 | 21.20 | 1.70 | 0.60 | 0.60 | | |
| 15 | | | | | 0.40 | 0.40 | | 7.10 | 0.70 | 0.60 | | |
| 16 | | | | | 0.50 | 0.30 | | | 0.70 | 0.60 | | |
| 18 | | | | | 0.40 | 0.30 | | | 0.60 | 0.60 | | |
| 20 | | | | | 0.40 | 0.30 | | | 0.80 | 0.60 | | |
| 21 | | | | | 0.60 | 0.30 | | | 0.80 | 0.70 | | |
| 22 | | | | | 1.10 | 0.30 | | | 0.80 | 0.70 | | |

| | 13 | 14 | 15 | 16 | 17 | 18 | 19 | 20 | 21 | 22 | 23 | 24 | 25 |
|---|---|---|---|---|---|---|---|---|---|---|---|---|---|
| | | | | | | | Agent | | | | | | |
| | Glyoxal | Glyoxal | Proxel | Proxel | Proxel | Proxel | Kathon LX | Kathon LX | Control | Glutar-aldehyde | Glutar-aldehyde | Glyoxal | GLyoxal |
| | | | | | | | Level (ppm) | | | | | | |
| Week | 100 | 1000 | 1000 | 1000 | 100 | 100 | 1000 | 1000 | | 1000 | 1000 | 1000 | 2063 |
| 0 | — | — | — | — | — | — | — | — | 0.20 | — | — | — | — |
| 1 | 0.75 | 0.80 | 0.85 | 0.90 | 0.60 | 0.65 | 1.90 | 1.50 | 0.20 | 0.20 | 0.15 | 0.10 | 0.20 |
| 2 | 0.75 | 0.85 | 1.00 | 1.00 | 0.60 | 0.60 | 1.80 | 1.35 | 0.20 | 0.25 | 0.20 | 0.10 | 0.20 |
| 3 | — | — | — | — | — | — | — | — | 0.30 | 0.20 | 0.20 | 0.30 | 0.25 |
| 4 | — | — | — | — | — | — | — | — | 2.40 | 0.20 | 0.20 | 0.30 | 0.40 |
| 5 | — | — | — | — | — | — | — | — | 7.10 | 0.20 | 0.20 | 0.40 | 0.35 |
| 6 | 0.50 | 0.60 | 0.50 | 0.50 | 0.50 | 0.50 | 1.50 | 1.20 | 11.70 | 0.20 | 0.20 | 0.30 | 0.30 |
| 7 | 0.40 | 0.60 | 0.80 | 0.80 | 0.50 | 0.50 | 1.40 | 1.20 | 18.40 | 0.10 | 0.10 | 0.30 | 0.30 |
| 8 | — | — | — | — | — | — | — | — | | 0.20 | 0.20 | 0.30 | 0.40 |
| 9 | 0.40 | 0.50 | 0.40 | 0.40 | 0.40 | 0.40 | 1.30 | 1.10 | | — | — | — | — |
| 10 | 7.90 | 2.40 | 0.70 | 0.70 | 0.40 | 0.55 | 1.20 | 1.00 | | 0.25 | 0.45 | 0.30 | 0.50 |
| 11 | 17.90 | 5.20 | 0.60 | 0.40 | 0.40 | 0.50 | 1.10 | 0.95 | | — | — | — | — |
| 12 | 24.80 | 8.20 | 0.70 | 0.70 | 0.40 | 0.50 | 1.10 | 0.90 | | 0.30 | 1.10 | 0.50 | 1.30 |
| 13 | | | 0.70 | 0.50 | 0.35 | 0.45 | 0.90 | 0.80 | | 0.30 | 1.20 | 0.50 | 0.60 |
| 14 | | | 0.50 | 0.45 | 0.35 | 0.40 | 0.85 | 0.70 | | 0.30 | 1.30 | 0.50 | 0.70 |
| 15 | | | 0.30 | 0.40 | 0.25 | 0.35 | 0.80 | 0.70 | | 0.60 | 1.50 | 0.40 | 0.70 |
| 16 | | | 0.40 | 0.40 | 0.25 | 0.30 | 0.80 | 0.60 | | 0.45 | 1.30 | 0.60 | 0.60 |
| 18 | | | 0.50 | 0.40 | 0.25 | 0.30 | 0.70 | 0.60 | | 0.70 | 1.30 | 0.50 | 0.50 |
| 20 | | | 0.40 | 0.40 | 0.30 | 0.30 | 0.60 | 0.60 | | 0.80 | 1.20 | 0.60 | 0.50 |
| 21 | | | 0.40 | 0.40 | 0.30 | 0.30 | 0.70 | 0.50 | | | | | |

TABLE 4-continued

| | | Treatment | | | | |
|---|---|---|---|---|---|---|
| 22 | 0.50 | 0.50 | 0.30 | 0.40 | 0.70 | 0.50 |

Treatments 1, 11, and 21 are unrelated controls; a drastic increase in acidity was noted in the fourth, second, and fourth week, respectively. Treatments 2, 4, and 12 employed anionic and nonionic surfactants; these materials delayed the onset of acid buildup until the fifth, sixth, and seventh weeks, respectively. The aldehydes, treatments 5–10, 13, 14, and 22–25, were quite effective, particularly at the 1000 ppm level. Proxel (treatments 15–18) and Kathon (treatments 19–20), which are both sold commercially as antimicrobial agents, also performed well.

Whereas the untreated controls exhibited significant acid buildup after just 2 to 4 weeks, many sulfur specimens treated with antimicrobial agents in accordance with this invention exhibited no significant acid buildup for as long as 22 weeks. Thus, it may be anticipated that water-quenched particulate sulfur treated in accordance with this invention can be stored moist in piles for at least about 6 months without objectionable acid buildup.

As used throughout the specification and the claims with reference to particulate sulfur, the terms "acidity" and "acid content" refer to the total acid content of the sulfur calculated as $H_2SO_4$.

Although this invention has been described in detail with reference to certain embodiments thereof, many other embodiments are possible. Thus, the invention is not limited to the specific embodiments described herein, since many obvious modifications can be made, and it is intended to include within this invention any such modifications as will fall within the scope of the following claims.

I claim:

1. A process which comprises storing particulate sulfur for at least about 1 month, the sulfur comprising an antimicrobial agent and at least about 1 weight percent moisture.

2. The process defined in claim 1 which comprises quenching molten sulfur in water to form said particulate sulfur and treating said particulate sulfur with said antimicrobial agent.

3. The process defined in claim 1 wherein said sulfur comprises an antimicrobial agent selected from the group consisting of quaternary ammonium compounds, aldehydes, and isothiazolones.

4. The process defined in claim 1 wherein said sulfur comprises at least about 2 weight percent moisture.

5. The process defined in claim 1 wherein said sulfur initially comprises at least about 3 weight percent moisture and is stored for at least about 2 months.

6. A method comprising:
   combining particulate sulfur with an antimicrobial agent, and
   storing said sulfur for at least about 1 month, the sulfur comprising at least about 1 weight percent moisture during storage.

7. The method defined in claim 6 wherein said storing exposes the sulfur to the natural elements.

8. The method defined in claim 6 wherein said agent comprises an organic compound.

9. The method defined in claim 6 wherein said particulate sulfur after 1 month of storage has an acid content no greater than 0.2 weight percent, calculated as $H_2SO_4$.

10. The method defined in claim 6 wherein said particulate sulfur after 1 month of storage has an acid content no greater than 0.1 weight percent, calculated as $H_2SO_4$.

11. The method defined in claim 6 wherein said particulate sulfur after 1 month of storage has an acid content no greater than 0.02 weight percent, calculated as $H_2SO_4$.

12. The method defined in claim 6 wherein at least some of said particulate sulfur during said storage has a moisture content of at least about 2 percent by weight of sulfur.

13. The method defined in claim 6 wherein at least some of said particulate sulfur during said storage has a moisture content of at least about 3 percent by weight of sulfur.

14. The method defined in claim 6 wherein at least some of said particulate sulfur during said storage has a moisture content of at least about 4 percent by weight of sulfur.

15. The method defined in claim 6 wherein at least some of said particulate sulfur during said storage has a moisture content of at least about 5 percent by weight of sulfur.

16. A process which comprises:
   treating particulate sulfur having an initial acid content of less than about 0.2 weight percent, calculated as $H_2SO_4$, with an antimicrobial agent, and
   maintaining the resultant treated sulfur at a moisture content of at least about 1 percent by weight of sulfur for at least about 1 month,
   wherein the acid content of the treated sulfur is still less than about 0.2 weight percent after said 1 month.

17. The process defined in claim 16 wherein the sulfur has an initial acid content of less than about 0.1 weight percent, and the acid content of the treated sulfur is still less than about 0.1 weight percent after said 1 month.

18. The process defined in claim 16 wherein the sulfur has an initial acid content of less than about 0.02 weight percent, and the acid content of the treated sulfur is still less than about 0.02 weight percent after said 1 month.

19. The process defined in claim 16 wherein the acid content of the treated sulfur is still less than weight percent after 3 months, about 0.2 weight percent after 3 months.

20. The process defined in claim 17 wherein the acid content of the treated sulfur is still less than about 0.1 weight percent after 3 months.

21. The process defined in claim 18 wherein the acid content of the treated sulfur is still less than about 0.02 weight percent after 3 months.

22. The method defined in claim 17 wherein said moisture content of at least about 1 weight percent is maintained by storing the sulfur in an exposed pile large enough to retain said moisture content within at least some of the pile despite loss of some moisture by evaporation.

23. The method defined in claim 18 wherein said moisture content of at least about 1 weight percent is maintained by storing the sulfur in an exposed pile large enough to retain said moisture content within at least some of the pile despite loss of some moisture by evaporation.

24. The method defined in claim 21 wherein said moisture content is at least about 2 weight percent, which value is maintained by storing the sulfur in an exposed pile large enough to retain said moisture content within at least some of the pile despite loss of some moisture by evaporation.

25. Hydrocarbon-free particulate sulfur comprising an antimicrobial agent and between about 1 and about 10 weight percent moisture.

26. The composition as defined in claim 25 wherein:
said particulate sulfur is produced by quenching molten sulfur in water such that the particulate sulfur contains at least about 1 weight percent water, and
the antimicrobial agent is present in an amount sufficient to prevent the acidity of the sulfur from exceeding 0.2 weight percent with 1 month after the sulfur is produced.

27. The composition defined in claim 26 wherein the agent is present in an amount sufficient to prevent the acidity of the sulfur from exceeding 0.1 weight percent within 1 month after the sulfur is produced.

28. The composition defined in claim 26 wherein the agent is present in an amount sufficient to prevent the acidity of the sulfur from exceeding 0.02 weight percent within 1 month after the sulfur is produced.

29. Particulate sulfur as defined in claim 25 wherein said antimicrobial agent is present in an amount sufficient to prevent the acidity of said sulfur from increasing above 0.02 weight percent, calculated as $H_2SO_4$, when said sulfur is stored for at least 1 month under non-dehydrating conditions at 1 atmosphere and 25° C.

30. The particulate sulfur defined in claim 29 containing more than about 2 weight percent water.

31. The particulate sulfur defined in claim 29 containing more than about 3 weight percent water.

32. The particulate sulfur defined in claim 29 containing more than about 4 weight percent water.

33. The particulate sulfur defined in claim 29 containing more than about 5 weight percent water.

34. The particulate sulfur defined in claim 29 made by quenching molten sulfur in water.

35. The composition defined in claim 25 wherein the antimicrobial agent comprises a bactericide.

36. The composition defined in claim 25 wherein the antimicrobial agent comprises a bacteriostat.

37. The composition defined in claim 25 wherein the antimicrobial agent is effective against sulfur-oxidizing bacteria.

38. The composition defined in claim 25 which contains at least 1 weight percent water, and wherein the antimicrobial agent is applied on the surfaces of sulfur particles.

39. The composition defined in claim 38 comprising a quaternary ammonium compound.

40. The composition defined in claim 38 comprising an aldehyde.

41. The composition defined in claim 38 comprising an isothiazolone.

42. The composition defined in claim 3 comprising a base.

43. The composition defined in claim 39 wherein at least one substituent of the quaternary ammonium group is an alkyl group having at least 12 carbon atoms.

44. The composition defined in claim 38 comprising a mixture of different antimicrobial agents.

45. The composition defined in claim 38 comprising at least two different quaternary ammonium compounds.

46. The composition defined in claim 38 wherein the antimicrobial agent is effective against a microorganism capable of oxidizing elemental sulfur.

47. The process defined in claim 2 wherein the molten sulfur is quenched in water containing the antimicrobial agent.

48. The composition defined in claim 26 wherein the molten sulfur is quenched in water containing said antimicrobial agent.

* * * * *

UNITED STATES PATENT AND TRADEMARK OFFICE
CERTIFICATE OF CORRECTION

PATENT NO. : 5,041,275

DATED : August 20, 1991

INVENTOR(S) : Alex E. Miller

It is certified that error appears in the above-identified patent and that said Letters Patent is hereby corrected as shown below:

Column 12:
Claim 19, lines 52 and 53, delete "weight percent after 3 months,";
Column 13:
Claim 26, line 20, "with" should be -- within --;
Column 14:
Claim 42, line 22, "3" should be -- 38 --.

Signed and Sealed this

Third Day of November, 1992

Attest:

DOUGLAS B. COMER

Attesting Officer   Acting Commissioner of Patents and Trademarks